UNITED STATES PATENT OFFICE.

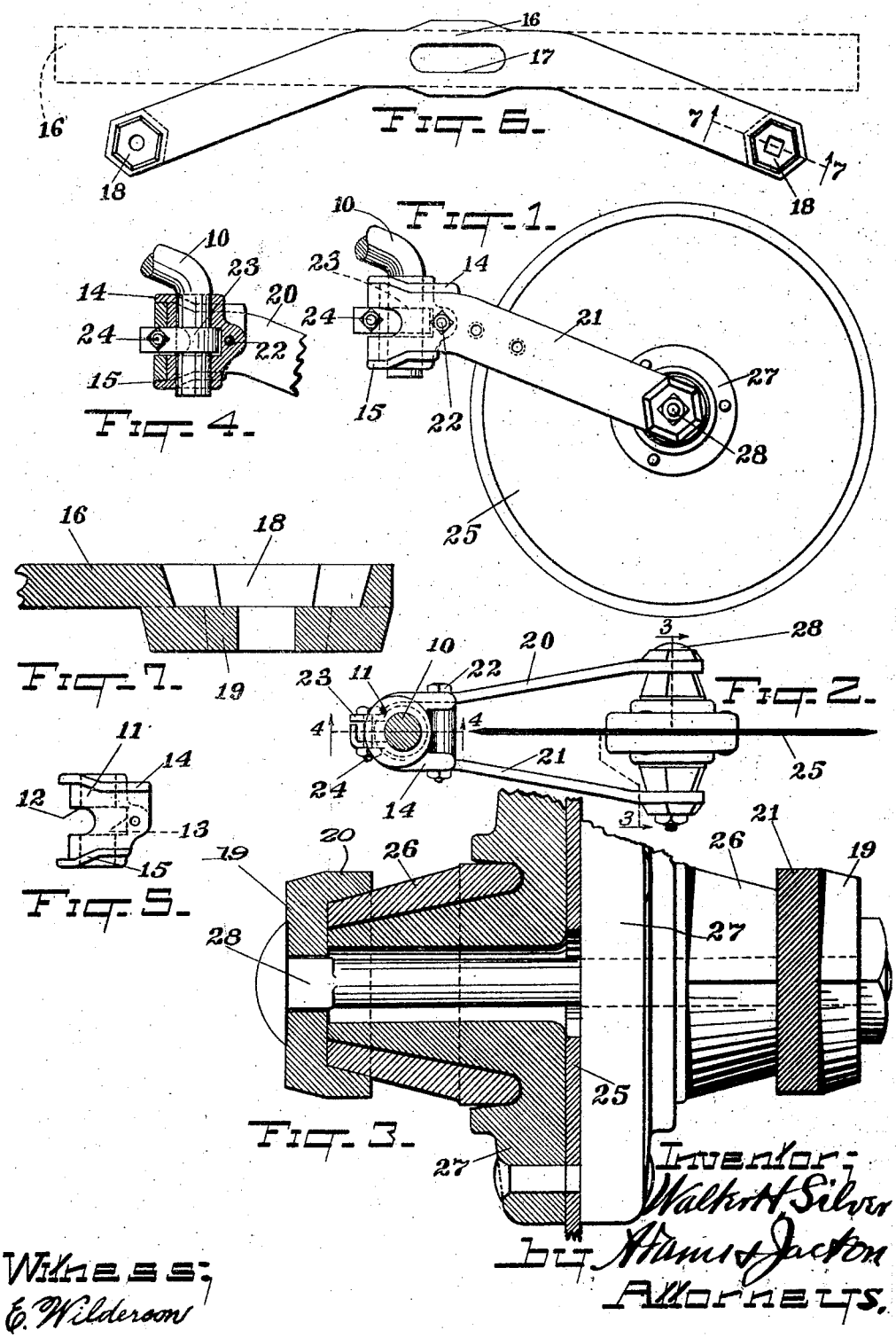

WALTER H. SILVER, OF MOLINE, ILLINOIS, ASSIGNOR TO DEERE & COMPANY, OF MOLINE, ILLINOIS, A CORPORATION OF ILLINOIS.

MEANS FOR MOUNTING COLTERS.

1,427,649.     Specification of Letters Patent.     Patented Aug. 29, 1922.

Application filed September 10, 1920. Serial No. 409,428.

*To all whom it may concern:*

Be it known that I, WALTER H. SILVER, a citizen of the United States, and a resident of Moline, in the county of Rock Island and State of Illinois, have invented certain new and useful Improvements in Means for Mounting Colters, of which the following is a specification, reference being had to the accompanying drawings.

My invention relates to means for mounting colters and it has for its object the provision of a new and improved form and arrangement of parts by which a light, strong mounting structure is afforded which can be manufactured cheaply and easily from bar metal to a large extent. The preferred means by which I have accomplished my object are illustrated in the drawings and are hereinafter specifically described. That which I believe to be new and desire to cover by Letters Patent is set forth in the claims.

In the drawings:—

Fig. 1 is a side view of a colter mounted in position by the use of my improved construction;

Fig. 2 is a top view, partly in section, of the parts shown in Fig. 1;

Fig. 3 is an enlarged sectional view taken on line 3—3 of Fig. 2;

Fig. 4 is a section taken on line 4—4 of Fig. 2;

Fig. 5 is a side view of the bracket by which the colter arms are revolubly mounted in position;

Fig. 6 is a view of a partially formed blank from which the colter fork arms are made; and Fig. 7 is an enlarged detail, being a section taken on line 7—7 of Fig. 6.

Referring to the drawings,—10 indicates a standard mounted upon an agricultural implement with its end portion extending vertically downward, as shown in Figs. 1 and 4. Surrounding said vertical end portions is a bracket 11 in the form of a sleeve, said sleeve being provided with a slot 12 in the wall at about midway between the ends, and having a groove 13 extending circumferentially on the inner face of the sleeve in alinement with the slot 12, as is best shown in Fig. 5. Ribs 14 and 15 are formed on the end portions of the sleeve extending circumferentially thereabout, the said ribs being slightly convergent at opposite sides of the bracket, as is shown in Figs. 1 and 5.

In Fig. 6 a bar 16 is shown in dotted lines, from which bar the fork arms for the colter are formed. As is shown in solid lines in Fig. 6, a slot 17 is formed in the bar, preferably by means of a power press, by which the width of the bar at its middle portion is slightly increased. At each side of the slot 17 the bar is bent edgewise, and in the outer ends of the bar angular openings 18 are pressed, as is best shown in Fig. 7. Caps 19 are secured upon the ends of the bar upon the outer faces of the openings 18, the caps 19 being preferably mounted in position by welding.

With the bar 16 in the form shown in solid lines in Fig. 6, the bar is bent upon itself at its middle point so as to from a loop about the sleeve 11 for providing oppositely disposed arms 20 and 21 (see Fig. 2). As is best shown in Figs. 1 and 4, the widened portion of the bar 16 is adapted to occupy the space between the ribs 14 and 15 at their most widely separated portions, whereby the loop is held securely in position against rotary motion with respect to the sleeve 11. A bolt 22 passing through the arms 20 and 21 and through the bracket 11 serves to secure the arms rigidly in position with respect to the bracket. As clearly shown, this bolt 22 lies considerably at one side of the central opening in the bracket that receives the standard 10, the bracket being formed with a lateral projection through a hole in which said bolt passes.

The slot 17 of the bar 16 is brought into registration with the slot 12 of the sleeve 11 in the operation of mounting the arms upon the bracket. For holding the bracket revolubly in position upon the standard 10, a split collar 23 is inserted through the slots 17 and 12 into position in the groove 13 of the sleeve. The inner face of the collar 23 is of a size when the ends of the collar are spread apart to have a loose fit upon the standard 10, corresponding to the size of the bore of the sleeve 11, whereby the sleeve and collar 23 can be slipped together into position upon the end of the standard. The split collar 23 is then tightened in position upon the standard 10 by means of a bolt 24 which serves to hold the bracket against withdrawal from the standard while at the same time permitting rotary movement of the bracket. The split collar 23 with the bolt 24 therein serves as a stop acting upon the ends of the slots for limiting the rotary movement of the bracket about the standard 10.

As is shown in Fig. 3, the ends of the arms 20 and 21, which are in the form of caps as above described, fit upon the outer ends of the hub structure of a colter 25. In the construction there shown, the hub structure at each side comprises a tapered bearing 26 in the form of a sleeve that fits over one of the correspondingly-shaped end portions of the central hub member 27 that is riveted to the colter, so that such hub member 27 may freely rotate therein. The outer face of each tapered bearing member 26 is provided at its outer end portion with a plurality of faces arranged angularly with respect to each other, the shape being such as to snugly fit within the angular opening 18 of one of the arms 20 or 21, whereby such arm and the bearing member 26 that it connects with will be held against rotative movement relative to each other, but will permit a free rotation of the said colter and its attached members 27—27. The caps 19 that are secured upon the outer faces of the arms 20—21, respectively, at the ends of such arms and opposite the said holes 18 serve to exclude any dirt from the joints between the members 26 and the tapered hub members, and also serve to support a bolt 28 that passes through them, and secures the several parts of the hub structure together.

By the use of my construction I have provided a mounting structure which is adapted to hold a colter firmly in position so as to have the desired horizontal swinging motion with respect to its standard. When desired the colter fork can be very readily removed from position by merely loosening the bolt 24. The construction is very simple and is made up largely of standard metal strap, whereby the device can be produced cheaply and easily.

What I claim as my invention and desire to secure by Letters Patent, is—

1. A colter fork comprising a sleeve-shaped bracket having a lateral projection, means for holding said bracket rotatably in position, arms formed by a bar bent upon itself about said bracket, and a bolt passing through said arms and lateral projection on the bracket for securing said parts rigidly together.

2. A colter fork comprising a bracket in the form of a sleeve and having a circumferentially-extending groove in its inner face, means mounted in said groove for holding said bracket rotatably in position, arms formed by a bar bent upon itself about said bracket, and means connecting said arms rigidly with said bracket at one side of the central opening through said bracket.

3. A colter fork comprising a bracket in the form of a sleeve, said sleeve being provided with a slot through one side wall portion and having a circumferentially-extending groove in its inner face in registration with said slot, means mounted in said groove and extending through said slot for holding said bracket rotatably in position, arms formed of a bar bent upon itself about said bracket, and means connecting said arms rigidly with said bracket at one side of the central opening through said bracket.

4. A colter fork comprising a bracket in the form of a sleeve, said sleeve being provided with a slot through one side wall portion and having a circumferentially-extending groove in its inner face in registration with said slot, a split collar inserted into said groove through said slot in position for holding the bracket rotatably in position, arms formed of a bar bent upon itself about said bracket, and means connecting said arms rigidly with said bracket at one side of the central opening through said bracket.

5. A colter fork comprising a bracket in the form of a sleeve, said sleeve being provided with a slot through one side wall portion and having a circumferentially-extending groove in its inner face in registraton with said slot, means mounted in said groove and extending through said slot adapted to hold said bracket rotatably in position and serving as a stop for limiting the rotary motion of the bracket, arms formed of a bar bent upon itself about said bracket, and means connecting said arms rigidly with said bracket at one side of the central opening through said bracket.

6. A colter fork comprising a bracket in the form of a sleeve, said sleeve being provided with a slot through one side wall portion and having a circumferentially-extending groove in its inner face in registration with said slot, a split collar inserted into said groove through said slot and adapted to be tightened upon the colter standard for holding the bracket rotatably in position thereon, said collar being adapted also to limit rotary movement of said bracket about the standard, arms formed of a bar bent upon itself about said bracket, and means connecting said arms rigidly with said bracket at one side of the central opening through said bracket.

7. A colter fork comprising a bracket in the form of a sleeve, arms formed by a bar bent upon itself about said bracket, means on the surface of the bracket for holding the loop of said arms from rotary movement about the sleeve, and other means at one side of the central opening through said bracket for connecting said arms rigidly with said bracket.

8. A colter fork comprising a bracket in the form of a sleeve having circumferentially-disposed ribs in spaced relation on its outer face, said ribs being slightly convergent at the sides of the bracket, arms formed by a bar bent upon itself about said sleeve, the bar being wider at its looped portion to fit snugly between said ribs, and a bolt passing through said arms serving to hold them rigidly in position on said bracket.

9. A colter fork comprising a bracket in the form of a sleeve, said sleeve being provided with a slot through one side wall portion and having a circumferentially-extending groove in its inner face in registration with said slot, arms formed of a bar bent upon itself about said bracket, the loop of said arms being provided with a slot therein in registration with the slot in said sleeve, means mounted in said groove and extending through said slots for holding said bracket rotatably in position, and means connecting said arms rigidly with said bracket at one side of the central opening through said bracket.

10. A colter fork comprising a bracket, means for holding said bracket rotatably in position, arms formed by a bar bent upon itself about said bracket, means connecting said arms rigidly with said bracket, the ends of the arms having angular openings stamped therein to adapt them to fit over angular hub members of a colter, and having caps secured to the outer faces of the arms over said openings.

11. A colter fork comprising a bracket in the form of a sleeve, means for holding said bracket rotatably in position, arms formed by a bar bent upon itself about said bracket, and means connecting said arms rigidly with said bracket, said arms being bent edgewise so as to stand in diagonal position with respect to the axis of said sleeve.

12. A colter-fork comprising in combination a bracket in the form of a sleeve, means for rotatably holding said bracket in a vertical position, a bar bent upon itself to form a loop and two approxmately-parallel downwardly inclined arms, and means located at one side of the central opening in said bracket for connecting said arms together and effecting a clamping of said loop upon the bracket, each of said arms having an angular opening in its outer end portion for non-rotatably receiving and holding a hub member.

13. A colter-fork comprising a bracket in the form of a sleeve having on the outer surface thereof two circumferentially-disposed ribs in spaced relation, the space between such ribs varying in width, and a bar bent upon itself to form a loop about said sleeve, the width of such loop varying to adapt it to fit between said ribs.

14. A colter-fork comprising a bracket in the form of a sleeve having on the outer surface thereof two circumferentially-disposed ribs in spaced relation, the space between such ribs varying in width, and a bar bent itself to form a loop about said sleeve, the width of such loop varying to adapt it to fit between such ribs, and means located at one side of the central opening in the sleeve for drawing the two arms of the bent bar together to cause a clamping of the loop to the sleeve.

WALTER H. SILVER.